Figure 1:
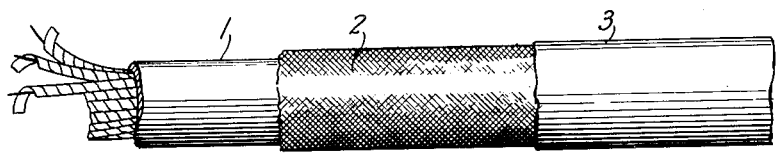

Nov. 14, 1933.  A. R. KEMP  1,935,322

LEAD COVERED CABLE

Filed March 1, 1930

INVENTOR
A. R. KEMP
BY J. W. Schmied
ATTORNEY

Patented Nov. 14, 1933

1,935,322

UNITED STATES PATENT OFFICE 1,935,322

LEAD COVERED CABLE

Archie R. Kemp, Westwood, N. J., assignor to Bell Telephone Laboratories, Incorporated, New York, N. Y., a corporation of New York Application March 1, 1930. Serial No. 432,285

2 Claims. (Cl. 173—266)

This invention relates to electric cables and more particularly to improvements in the construction of underground lead covered cables.

An object of this invention is to produce an insulating envelope, or covering, for the lead sheath which will protect the sheath from corrosion and mechanical injury.

One advantage obtained by the use of cable constructions in accordance with this invention is that the suggested cable covering can replace the lead sheath in part without any loss of protection to the cable and with a corresponding substantial saving in lead.

A further advantage is that such a covering tends to prevent that flattening of the cable which tends to occur when the cable is bent.

Lead covered telephone cables are either drawn into cement conduits, or, being provided with the usual armor, are embedded in the ground. The lack of a suitable protecting jacket has been found to be a source of difficulty. Lead sheath is subject to mechanical injury, electrolytic action, and chemical corrosion. Many compositions heretofore used for covering the lead sheath have not suitably protected the metal from mechanical injury by sharp stones and accidental blows from picks, etc., and from corrosion occasioned by moisture penetrating the outer covering of the sheath. Nor do wire or tape armor, which are sometimes provided for lead cables and which cost a great deal, always protect the sheath from stray power currents which cause extensive damage.

In accordance with this invention these difficulties are overcome by providing a tight, close fitting asbestos insulation covering for the lead sheath. An insulating envelope comprised of interwoven asbestos covered metal wire of the type used as brake linings on automobiles is contemplated. Such an envelope is tough and hard, and it would effectively prevent mechanical injury to a cable. The construction of this envelope may take the form of a tape, wrapping, serving, or braiding wound on the sheath. It may also be applied as a very close spinning or braiding. The envelope may consist of a single layer or a plurality of layers wound either in the same or in the opposite direction on the sheath. If desired, the wires may be omitted, in which case the asbestos fibers could be suitably braided or interwoven. Additional protection against the elements may be had by impregnating the asbestos with asphalts, stearin pitch, bakelite or other suitable compounds which effectively prevent chemical and electrolytical corrosion and at the same time provide a moisture proof and, in some cases, a fire-proof covering. Whichever impregnating compound is used may be applied by any of the methods known to those skilled in the art. Its application may take place before, with, or after the application of the asbestos covering.

The result of the above process is a cable which may be laid directly in the earth without any conduits or any other additional protection against cutting or moisture. The resulting saving of the expense of conduits and reduction in the installation cost will serve to compensate for the cost of the asbestos covering.

Due to the strength and high degree of protection afforded by applicant's cable covering, the standard thickness of the lead sheath which is ordinarily applied to underground cables may be reduced without imperiling the safety of the cable conductors. The resulting reduction in expense, due to the reduction in the amount of lead required, will offset to a considerable extent the initial cost of the suggested insulating envelope.

Figure 2:
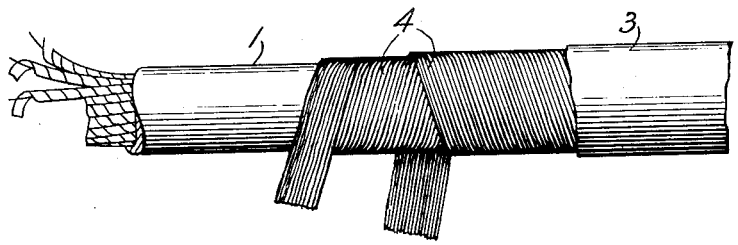
Figure 3:
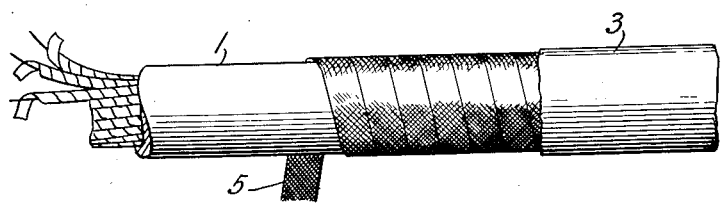

Several embodiments of the invention will now be described in connection with the accompanying drawing, in which:

Figs. 1 to 3 show an electric cable having asbestos coverings embodying several preferred constructions of this invention.

In Fig. 1 the cable comprises a lead cable sheath 1, a braided or woven asbestos covering 2, and a layer 3 consisting of a fire-proof and waterproof stearin pitch composition.

In Fig. 2 the cable comprises a lead cable sheath 1, wrappings or servings of asbestos 4 wound in opposite directions on the sheath and a layer 3 consisting of a fire-proof and water-proof stearin pitch composition.

In Fig. 3 the cable comprises a lead cable sheath 1, asbestos tape or ribbon of a braided or woven construction 5 and a layer 3 consisting of a fireproof and water-proof stearin pitch composition.

The asbestos layers 2, 4 and 5 in the drawing may be used with or without metal wire enclosed within the asbestos fibers. The compound 3 is applied in a manner to fill all the interstices in the asbestos. The compound is usually sprinkled with mica powder to prevent sticking and its surface polished by passing through a die.

It has been suggested that this type of cable be used underground, but it may also be substituted for ordinary types of armored tree wire. In fact, electric cables made in accordance with the above suggestions are suitable for use wherever cables are subjected to the destructive action of the elements. It will be obvious that various other modifications may be made by those skilled in the art without departing from the invention as defined in the following claims.

What is claimed is:

1. An electric cable comprising an insulated conductor and a lead sheath surrounding said conductor, characterized in this, that there is provided around the lead sheath an outer protecting jacket of braided asbestos covered wire, said jacket being impregnated with a fire-proof and water-proof compound.

2. A flexible armored cable comprising a conductor, a lead sheath enclosing said conductor, and an outer protecting layer of asbestos covered metal wire, placed around the outside of the lead sheath, said layer being impregnated with a water-proof and fire-proof compound.

ARCHIE R. KEMP.